(12) United States Patent
Oh (10) Patent No.: US 11,341,537 B2
(45) Date of Patent: May 24, 2022

(54) PHONE CALL BROKERAGE SYSTEM AND VEHICLE INFOTAINMENT SYSTEM INCLUDING THE SAME

(71) Applicant: HYUNDAI MOBIS Co., Ltd., Seoul (KR)

(72) Inventor: Jeongmin Oh, Plymouth, MI (US)

(73) Assignee: Hyundai Mobis Co., Ltd., Seoul (KR)

( * ) Notice: Subject to any disclaimer, the term of this patent is extended or adjusted under 35 U.S.C. 154(b) by 37 days.

(21) Appl. No.: 16/897,873

(22) Filed: Jun. 10, 2020

(65) Prior Publication Data
US 2021/0390583 A1 Dec. 16, 2021

(51) Int. Cl.
*G06Q 30/02* (2012.01)
*H04W 4/44* (2018.01)
*G06Q 30/06* (2012.01)

(52) U.S. Cl.
CPC ..... *G06Q 30/0267* (2013.01); *G06Q 30/0277* (2013.01); *G06Q 30/06* (2013.01); *H04W 4/44* (2018.02)

(58) Field of Classification Search
CPC ........... G06Q 30/0267; G06Q 30/0277; G06Q 30/06; H04W 4/44
USPC ............ 455/414.1, 422.1, 418, 432.1, 404.2, 455/456.1
See application file for complete search history.

(56) References Cited

U.S. PATENT DOCUMENTS

| | | | | |
|---|---|---|---|---|
| 2003/0055743 A1* | 3/2003 | Murcko, Jr. | ........... | G06Q 30/06 705/26.2 |
| 2004/0092253 A1* | 5/2004 | Simonds | ............. | B60R 16/0315 455/414.2 |
| 2012/0282905 A1* | 11/2012 | Owen | ..................... | H04W 8/22 455/414.1 |
| 2016/0073254 A1* | 3/2016 | Rosen | ..................... | H04W 4/16 455/414.1 |
| 2019/0333105 A1* | 10/2019 | Randall | .............. | G06Q 30/0255 |

* cited by examiner

*Primary Examiner* — Nghi H Ly
(74) *Attorney, Agent, or Firm* — H.C. Park & Associates, PLC (57) ABSTRACT

A method of providing a phone call brokerage service to a driver of a vehicle, the method includes: by an on-vehicle brokerage system, receiving a radio signal from a radio station, the radio signal including an advertisement and a metadata of an advertisement; initiating the phone call brokerage service in response to receiving a phone call request from the driver, including: generating a service request for the phone call brokerage service including the metadata of the advertisement; establishing a wireless connection between the on-vehicle brokerage system and the brokerage server, including: transmitting the service request for the phone call brokerage service to the brokerage server; and by the brokerage server, establishing a phone call connection between the brokerage server and an advertiser corresponding with the metadata of the advertisement; and relaying voice signals between the driver and the advertiser over the wireless connection and the phone call connection.

6 Claims, 5 Drawing Sheets

PHONE CALL BROKERAGE SYSTEM AND VEHICLE INFOTAINMENT SYSTEM INCLUDING THE SAME

BACKGROUND OF THE INVENTION

The present invention relates to a phone call brokerage system and vehicles infotainment system including the same.

A vehicle is generally equipped with an infotainment (information+entertainment) system including radio system. Under conventional radio system, advertisers may provide a driver of the vehicle with contact information for the advertised goods and/or services to the driver to using the audio or text carried over the radio signal. For example, the advertiser may provide the driver with phone numbers, Phonespell®, URLs, address of the business, etc.

However, the driver generally has limited ways to reach the advertiser while driving. Due to the nature of the broadcasting system, customer experiencing difficulty to contact to the advertiser. The advertiser may utilize the Phonespell®, which is easy word that can be converted into phone number, it is still not easy for the drivers to contact the advertiser especially while they are driving.

The above information disclosed in this Background section is only for understanding of the background of the inventive concepts, and, therefore, it may contain information that does not constitute prior art.

SUMMARY

Devices constructed according to exemplary implementations of the invention are capable of providing a phone call brokerage system and a vehicles infotainment system including the phone call brokerage system.

Additional features of the inventive concepts will be set forth in the description which follows, and in part will be apparent from the description, or may be learned by practice of the inventive concepts.

According to one or more exemplary embodiments of the present invention, a method of providing a phone call brokerage service to a driver of a vehicle using a phone call brokerage system including an on-vehicle brokerage system and a brokerage server, the method includes: receiving, by the on-vehicle brokerage system, a radio signal from a radio station, the radio signal including an advertisement and a metadata of an advertisement; initiating, by the on-vehicle brokerage system, the phone call brokerage service in response to receiving a phone call request from the driver, including: generating a service request for the phone call brokerage service including the metadata of the advertisement; establishing, by the on-vehicle brokerage system, a wireless connection between the on-vehicle brokerage system and the brokerage server, including: transmitting the service request for the phone call brokerage service to the brokerage server; establishing, by the brokerage server, a phone call connection between the brokerage server and an advertiser corresponding with the metadata of the advertisement; and relaying voice signals between the driver and the advertiser through the wireless connection established between the on-vehicle brokerage system and the brokerage server and the phone call connection between the brokerage server and the advertiser.

The establishing of the phone call connection may include: extracting a contact information of the advertiser; and initiating the phone call with the advertiser by calling the advertiser using the contact information.

The relaying of the voice signals may include: transmitting the voice signal of the advertiser from the advertiser to the driver, including: transmitting the voice signal of the advertiser from the advertiser to the brokerage server over the phone call connection between the brokerage server and the advertiser; and transmitting the voice signal of the advertiser from the brokerage server to the on-vehicle brokerage system over the wireless connection established between the on-vehicle brokerage system and the brokerage server.

The relaying of the voice signals may include: transmitting the voice signal of the driver from the driver to the advertiser, including: transmitting the voice signal of the driver from the on-vehicle brokerage system to the brokerage server over the wireless connection established between the on-vehicle brokerage system and the brokerage server; and transmitting the voice signal of the driver from the brokerage server to the advertiser over the phone call connection between the brokerage server and the advertiser.

The on-vehicle brokerage system may include: a controller; a car radio; a broker module; a wireless communication module; and a data storage, and the receiving of the radio signal includes: receiving, by the car radio, the radio signal, extracting the advertisement from the radio signal, and playing the advertisement to the driver.

The initiating of the phone call brokerage service may include: extracting the metadata of the advertisement presented to the driver.

According to one or more exemplary embodiments of the present invention, an on-vehicle brokerage system of a phone call brokerage system including an on-vehicle brokerage system and a brokerage server for providing a phone call brokerage service to a driver of a vehicle, the on-vehicle brokerage system includes: a car radio configured to receive a radio signal from a radio station, the radio signal being a modulated signal including an advertisement and metadata of the advertisement; a controller configured to control and process the signals between the components of the on-vehicle brokerage system; a broker module configured to initiate the phone call brokerage service; and a wireless communication module configured to establish a wireless communication with the brokerage server to perform the phone call brokerage system.

The car radio may be further configured to extract the advertisement and play the advertisement to the driver, the broker module may be configured to generate a service request for the phone call brokerage service, and the wireless communication module may be further configured to transmit the service request for the phone call brokerage service to the brokerage server.

The wireless communication module may be further configured to, in response to transmitting the service request for the phone call brokerage service to the brokerage server, receive a voice signal from the advertiser, and transmit a voice signal from the driver to the brokerage server, and the car radio may be further configured to play the voice signal from the advertiser, and record the voice signal from the driver.

The car radio may include an input apparatus configured to receive a phone call request from the driver, the car radio being further configured to transmit the phone call request to the controller, and the controller may be further configured to, in response to receiving the phone call request from the car radio, instruct the broker module to initiate the phone call brokerage service using the metadata of the advertisement.

The car radio may be further configured to extract the metadata of the advertisement from the radio signal and transmit the metadata of the advertisement to the controller.

The car radio may be further configured to transmit the radio signal to the controller, and the controller may be further configure to extract the metadata of the advertisement from the radio signal and transmit the metadata of the advertisement to the car radio.

The on-vehicle brokerage system may further include a data storage configured to store at least one of the metadata of the advertisement, the service requests of the phone call brokerage service, and a history of the phone brokerage service.

According to one or more exemplary embodiments of the present invention, a brokerage server of a phone call brokerage system including an on-vehicle brokerage system and a brokerage server for providing a phone call brokerage service to a driver of a vehicle, the brokerage server includes: a controller control and process the signals between the components of the brokerage server; a wireless communication module configured to establish a wireless communication with the on-vehicle brokerage system to perform the phone call brokerage system; a brokerage system configured to establish a telephone communication between the brokerage server and the advertiser; and a data storage storing contact information of advertisers in advance.

The controller may be further configured to, in response to receiving the service request for the phone call brokerage service from the on-vehicle brokerage system, extract the metadata of the advertisement from the service request for the phone call brokerage.

The controller may be further configured to extract the contact information of the advertiser that matches the metadata of the advertisement.

The controller may be further configured to transmit the contact information of the advertiser to the brokerage system and instruct the brokerage system to initiate the phone call with the advertiser, and the brokerage system may be configured to, in response to receiving the instruction to initiate the phone call with the advertiser, call the advertiser over a telephone communication using the contact information received from the controller.

The brokerage system may be configured to receive a voice signal from the advertiser and transmit the voice signal from the advertiser to the controller, and the controller may be configured to relay the voice signal from the advertiser to the on-vehicle brokerage system via the wireless communication module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
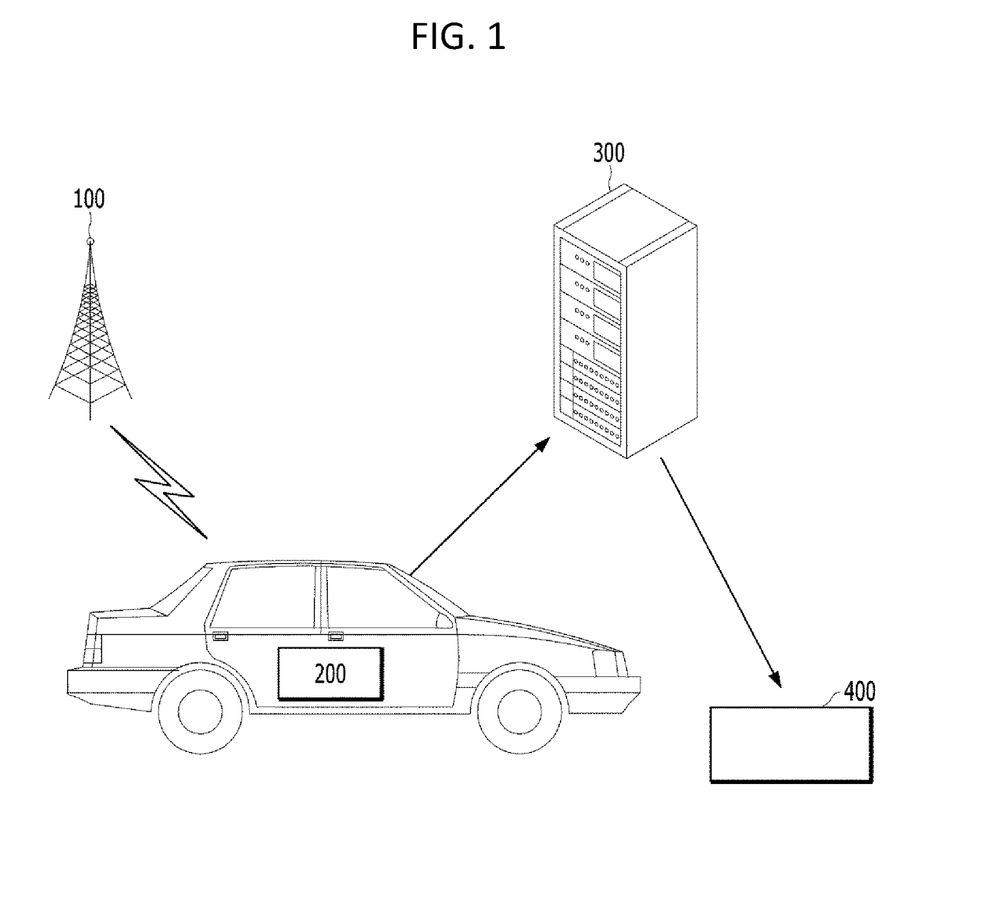
FIG. 1 is a conceptual diagram illustrating an overall operation of phone call brokerage system, according to an exemplary embodiment of the present disclosure.

FIG. 1 is a conceptual diagram illustrating an overall operation of phone call brokerage system, according to an exemplary embodiment of the present disclosure.

The overall operation of phone call brokerage system according to the exemplary embodiment of the present disclosure may include a radio station 100, an on-vehicle brokerage system 200, a brokerage server 300, and a advertiser 400.

The radio station 100 may transmit radio signal to broadcast audio data. For example, the radio station 100 may transmit audio data over carrier signal. The audio data may be incorporated into the carrier wave via the amplitude modulation (AM) or the frequency modulating (FM). Furthermore, the radio station 100 may be a digital broadcasting service, such as HD Radio® and SeriusXM®.

According to the exemplary embodiments, the radio station 100 may incorporate metadata and the audio data into the carrier wave. The metadata of the audio data is the information that may be used to identify, label, and present the audio data. For example, when the radio station 100 broadcasts music data over the radio signal, the metadata may incorporate the metadata of the music data, such as track artist, genre, label, song titles, album name, track numbers, etc. When the radio station 100 broadcasts advertisement over the radio signal, the metadata may incorporate the metadata of the advertisement, such as advertiser name, advertiser phone number, advertiser address, advertised goods and/or services, etc. When the radio station 100 is a digital broadcasting service, the radio station 100 may also include further information that requires picture data in the radio signal corresponding to the audio data of the radio signal, such as album art and advertiser's trademark.

The on-vehicle brokerage system 200 may receive the radio signal from the radio station 100 to generate the audio data. Also, the on-vehicle brokerage system 200 may extract the metadata from the radio signal. The on-vehicle brokerage system 200 may use the extracted metadata that corresponds with the audio data of the radio signal. For example, the on-vehicle brokerage system 200 may extract the metadata of the music data from the radio signal. According to the exemplary embodiments, the on-vehicle brokerage system 200 may extract the metadata of the music data, such as track artist, genre, label, song titles, album name, track numbers, etc., from the radio signal. Furthermore, the on-vehicle brokerage system 200 may extract the metadata of the advertisement, such as an advertiser identification information including an advertisement code, a name of the advertiser, and information of the advertised goods and/or services, etc., from the radio signal.

According to the exemplary embodiments, the advertisement code may be a unique code assigned to the advertisement in advance. The advertisement code may be assigned to each advertisements in advance by the brokerage server 300, and the radio station 100 may incorporate the advertisement code as the metadata of the audio data in the radio signal.

The on-vehicle brokerage system 200 may communicate with the brokerage server 300 to request various services from the brokerage server 300. According to the exemplary embodiments, in case the on-vehicle brokerage system 200 extract the metadata of the music data from the radio signal, the on-vehicle brokerage system 200 may communicate with the brokerage server 300 to send a service request for detailed data service to the brokerage server 300. The on-vehicle brokerage system 200 may, in response to receiving the result of the detailed data service from the brokerage server 300, perform a detailed data service to the driver, including displaying album art and lyrics of the music data, and a phone number, an address, and office hours of the advertiser, and online/offline order form, etc. Also, in case the on-vehicle brokerage system 200 extract the metadata of the advertisement from the radio signal, the on-vehicle brokerage system 200 may communicate with the brokerage server 300 to send a service request for the phone call brokerage service to the brokerage server 300. For example, the on-vehicle brokerage system 200 may request the phone call brokerage service to establish a phone call connection between the driver and the advertiser 400, through the brokerage server 300.

According to the exemplary embodiment, the on-vehicle brokerage system 200 may generate the metadata of the advertisement from the radio signal through voice recognition. The on-vehicle brokerage system 200 may perform a voice recognition to recognize the content of the advertisement from the radio signal, and generate the metadata of the advertisement.

The brokerage server 300 is a service server wirelessly connected with the on-vehicle brokerage system 200. The brokerage server 300 may provide various services in response to receiving service request from the on-vehicle brokerage system 200. The brokerage server 300 may provide detailed information of the audio data in response to receiving detailed data service from the on-vehicle brokerage system 200. The brokerage server 300 may also provide the phone call brokerage service to establish phone call connection between the driver and the advertiser.

The brokerage server 300 may include information associated with the metadata of the radio signal transmitted from the radio station 100 to the on-vehicle brokerage system 200. The brokerage server 300 may include the album art or the lyrics corresponding to the metadata of the music data included in the radio signal transmitted from the radio station 100 to the on-vehicle brokerage system 200. Also, the brokerage server 300 may include contact information of advertisers corresponding to the metadata of the advertisement included in the radio signal transmitted from the radio station 100 to the 20.

According to the exemplary embodiment, the brokerage server 300 may provide detailed information of the audio data in response to receiving detailed data service from the on-vehicle brokerage system 200. The brokerage server 300 may, in response to receiving the request for the detailed data service from the on-vehicle brokerage system 200, provide detailed information such as the album art and the lyrics corresponding with the metadata of the music data, and a phone number, an address, and office hours of the advertiser, and online/offline order form, etc. corresponding with the metadata of the advertisement.

According to the exemplary embodiment, the brokerage server 300 may provide the phone call brokerage service to establish phone call connection between the driver and the advertiser. The brokerage server 300 may, in response to receiving the request for the phone call brokerage service from the on-vehicle brokerage system 200, provide the phone call brokerage service to the on-vehicle brokerage system 200. The brokerage server 300 may provide the phone call brokerage service by establishing the phone call connection between the on-vehicle brokerage system 200 and advertiser 400 in response to the metadata of the advertisement included in the request of the phone call brokerage service corresponding with the metadata of the advertiser included in the phone call brokerage request.

The advertiser 400 may receive a phone call connected with the driver of the vehicle via the on-vehicle brokerage system 200 through the phone call brokerage service via the brokerage server 300. The advertiser 400 may provide the metadata of the advertiser to the radio station 100 in advance, and the advertiser 400 may provide the phone number and detailed information of the advertiser to the brokerage server 300. Particularly, the advertiser 400 may provide the metadata of the advertisement, such as an advertiser identification information including an advertisement code, a name, and information of the advertised goods and/or services, etc. to the radio station 100. Furthermore, the advertiser 400 may provide the phone number of the advertiser for establishing the phone call brokerage service, and the detailed information of the advertiser including a phone number, an address, office hours of the advertiser, online/offline order form, etc. to the brokerage server 300.

Figure 2:
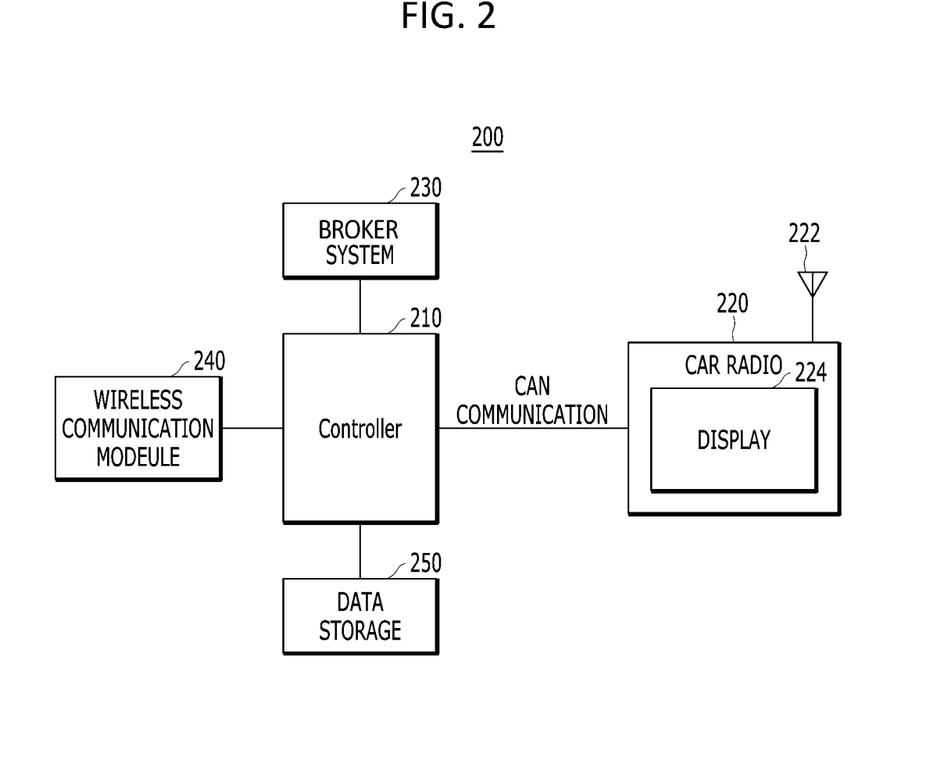
FIG. 2 is a block diagram illustrating the phone call brokerage system at head unit of a vehicle, according to an exemplary embodiment of the present disclosure.
Figure 3:
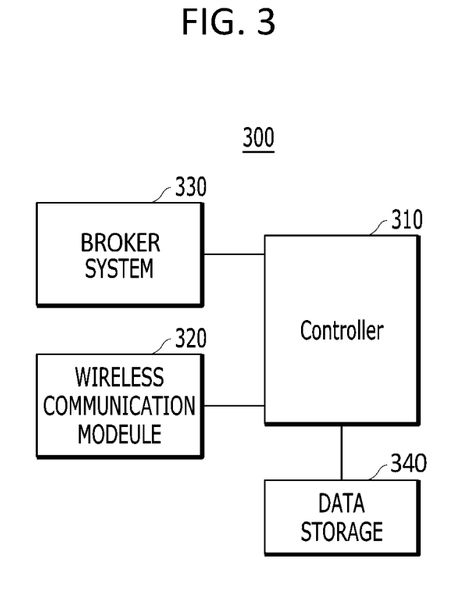
FIG. 3 is a block diagram illustrating the phone call brokerage server, according to an exemplary embodiment of the present disclosure.

FIG. 2 is a block diagram illustrating the on-vehicle brokerage system 200 at head unit of a vehicle, according to an exemplary embodiment of the present disclosure. FIG. 3 is a block diagram illustrating the brokerage server 300, according to an exemplary embodiment of the present disclosure.

As illustrated in FIG. 2, the on-vehicle brokerage system 200 for a vehicle according to the exemplary embodiment of the present invention may include a controller 210, a car radio 220, a broker module 230, a wireless communication module 240, and a data storage 250. The on-vehicle brokerage system 200 may be formed as a dedicated system, as a component of an electronic controllers (ECU) system, or share some of its components with the ECU system. The components of on-vehicle brokerage system 200, the ECU system, and the external in-vehicle components may be connected through various connections including a controller area network (CAN).

The controller 210 may be a processor that provides an overall control of the on-vehicle brokerage system 200. According to the exemplary embodiments, the controller 210 may be the Central Processing Unit (CPU) of the ECU system if the on-vehicle brokerage system 200 shares components of with the ECU system. Also, the controller 210 may be a dedicated CPU for the on-vehicle brokerage system 200 of the on-vehicle brokerage system 200 is formed as a dedicated system.

According to the exemplary embodiment, the controller 210 may control and process the signals between the components of the on-vehicle brokerage system 200. The controller 210 may control the transmission of the signals between the car radio 220, the broker module 230, the wireless communication module 240, and the data storage 250. The controller 210 may be connected to the car radio 220, the broker module 230, the wireless communication module 240, and the data storage 250 via various connections including the CAN communication.

The car radio 220 may include an radio antenna 222 and a display 224. The car radio 220 may receive radio signal transmitted from the 20. The car radio 220 may receive the radio signal transmitted from the 20 through the radio antenna 222. The car radio 220 may extract the audio data from radio signal modulated to incorporate the audio data and the carrier signal. The car radio 220 may present the audio data extracted from the radio signal to the driver in response to the driver's control.

The car radio 220 may transmit the radio signal to the Controller 210. The car radio 220 may transmit the radio signal including the metadata of the audio data to the Controller 210. In response, the car radio 220 may receive the metadata from the Controller 210. The car radio 220 may present the metadata received from the controller 210 which corresponds with the audio data on the display 224. According to the exemplary embodiments, the display 224 may display the metadata received from the controller 210 while presenting the audio data to the driver.

The car radio 220 may extract the metadata of the audio data from the radio signal and display the extracted metadata. The car radio 220 may present the extracted metadata which corresponds with the audio data on the display 224. According to the exemplary embodiments, the display 224 may display the metadata extracted from the radio signal received from the radio antenna 222 while presenting the audio data to the driver.

According to the exemplary embodiments, the car radio 220 may receive a phone call request input from the driver during the advertisement of the audio data is played to the driver. The car radio 220 may include input method through which the driver may input the phone call request. The car radio 220 may include various input methods. For example, the car radio 220 may include a physical button or a touch screen device to receive the phone call request input from the driver.

The car radio 220 may display the metadata on the display 224 corresponding with the audio data presented to the driver. In case the audio data is the music data, the display 224 may display the metadata of the music data that may be used to identify, label, and present the audio data. In case the audio data is the advertisement, the display 224 may display the metadata of the advertisement such as advertiser name, advertiser phone number, advertiser address, advertised goods and/or services, etc.

According to the exemplary embodiments, the car radio 220 may also receive detailed information of the audio data from the Controller 210, and display the detailed information of the audio data on the display 224. For example, the car radio 220 may display, in response to the audio data being the music data, the album art and the lyrics on the display 224. Also, the car radio 220 may display, in response to the audio data being the advertisement, the phone number, the address, the office hours of the advertiser, the online/offline order form, etc.

The broker module 230 may receive metadata of the audio data or the radio signal from the Controller 210. The broker module 230 may also generate the metadata from the radio signal from received from the Controller 210. The broker module 230 may generate the service request for the detailed data service and the service request for the phone call brokerage service.

According to the exemplary embodiments, the broker module 230 may transmit the generated service requests to the Controller 210. The broker module 230 may transmit the service request for the detailed data service and the service request for the phone call brokerage service to the Controller 210. The controller 210 may transmit the service requests received from the broker module 230 to the wireless communication module 240, so that the wireless communication module 240 may transmit the service requests to the brokerage server 300.

The wireless communication module 240 may provide a wireless connection between the on-vehicle brokerage system 200 and the brokerage server 300. The wireless communication module 240 may establish any wireless communication networks, for example but not limited to, CDMA, WiBro, WiFi, BT, etc.

According to the exemplary embodiments, the data storage 250 may store various information. The data storage 250 may receive the metadata extracted or generated from the radio signal from the Controller 210. Also, the data storage 250 may receive the service requests from the Controller 210. The data storage 250 may receive the detailed information corresponding to the metadata of the audio data received from brokerage server 300 through wireless communication module 240 and Controller 210. The data storage 250 may also receive history of the phone brokerage service from the Controller 210. The data storage 250 may store the various information received from the Controller 210. Furthermore, the controller 210 may access the data storage 250 to retract the various information stored in the data storage 250.

As illustrated in FIG. 3, the brokerage server 300 according to the exemplary embodiment of the present invention may include a controller 310, a wireless communication module 320, a brokerage system 330, and a data storage 340.

The controller 310 may be a processor that provides an overall control of the brokerage server 300. The controller 310 may control the wireless communication of wireless communication module 320 and storing data to and retrieving data from the data storage 340. The controller 310 may, in response to receiving a service request for detailed data service from the on-vehicle brokerage system 200 via the wireless communication module 320, respond to the received service request for detailed data service by providing the detailed information of the audio data corresponding to the metadata included in the received service request for detailed data service. Furthermore, the controller 310 may, in response to receiving the request for the phone call brokerage service from the on-vehicle brokerage system 200 via the wireless communication module 320, the controller 310 may control the brokerage system 330 to call the advertiser over a telephone communication. The controller 310 may extract the contact information of the advertiser from data storage 340 that corresponds with the metadata of the advertisement included in the request for the phone call brokerage service received from the on-vehicle brokerage system 200. The controller 310 may instruct the brokerage system 330 to establish a telephone communication between the brokerage server 300 and the advertiser 400, using the contact information stored in the data storage 340 in advance.

The wireless communication module 320 may provide a wireless connection between the on-vehicle brokerage system 200 and the brokerage server 300. The wireless communication module 320 may establish any wireless communication networks, for example but not limited to, CDMA, WiBro, WiFi, BT, etc., corresponding to the wireless communication network of the wireless communication module 240.

The brokerage system 330 may, according to the instruction received from the controller 310, establish a telephone communication with the advertiser 400 corresponding to the request for the phone call brokerage service received from the on-vehicle brokerage system 200. The brokerage system 330 may establish a telephone communication with the advertiser 400 by calling the advertiser 400 over the conventional telephone communication using the contact information of the advertiser 400.

The data storage 340 may store various information, and also transmit the various information to the controller 310 upon request. The data storage 340 may store contact information of advertisers in advance. The data storage 340 may also store the detailed information of the music data and the advertisement corresponding to the audio data of the radio signal generated by the radio station 100.

According to the exemplary embodiment, the controller 310 may, in response to receiving the request for detailed data service from the on-vehicle brokerage system 200, provide the detailed information corresponding to the request for detailed data service to the on-vehicle brokerage system 200. In response to receiving the request for detailed data service from the on-vehicle brokerage system 200, the controller 310 may extract the metadata of the audio data of the radio signal included in the request for detailed data service. The controller 310 may access the data storage 340 and extract the detailed information of the music data and the advertisement corresponding to the metadata of the audio data of the radio signal extracted from the request for detailed data service. The controller 310 may transmit the detailed information of the audio data to the wireless communication module 320, and the wireless communication module 320 may transmit the detailed information to on-vehicle brokerage system 200.

According to the exemplary embodiment, the controller 310 may, in response to receiving the request for the phone call brokerage service from the on-vehicle brokerage system 200, instruct the brokerage system 330 to establish the telephone communication with the advertiser 400. In response to receiving the request for the phone call brokerage service from the on-vehicle brokerage system 200, the controller 310 may extract the metadata of the advertiser from the receive request for the phone call brokerage service. The controller 310 may access the data storage 340 and extract the contact information of an advertiser corresponding to the metadata of the advertiser extracted from the receive request for the phone call brokerage service. The controller 310 may transmit the extracted contact information of the advertiser corresponding to the request for the phone call brokerage service, and instruct the brokerage system 330 to initiate the phone call with the advertiser 400.

Referring to FIGS. 2 and 3, in response to the service request for the phone call brokerage service, the on-vehicle brokerage system 200 and the brokerage server 300 may establish a phone call connection between the driver and the advertiser 400 via the brokerage server 300 without a telephone device on the part of the driver.

According to the exemplary embodiments, the controller 210 may transmit various information to data storage 250 for data storage purposes. The controller 210 may transmit the metadata extracted or generated from the radio signal to the data storage 250. Also, the controller 210 may transmit the service requests to the data storage 250. The controller 210 may transmit the detailed information corresponding to the metadata of the audio data received from brokerage server 300 through wireless communication module 240 to the data storage 250. The controller 210 may also generate the history of the phone brokerage service and transmit the history of the phone brokerage service to the 215.

According to the exemplary embodiments, the controller 210 may receive data from the car radio 220. The controller 210 may receive data extracted from the radio signal from car radio 220. According to the exemplary embodiments, the controller 210 may directly receive, from car radio 220, the radio signal received through the radio antenna 222. Also, the controller 210 may receive the metadata from the car radio 220.

According to the exemplary embodiments, the controller 210 may directly receive, from car radio 220, the radio signal received through the radio antenna 222. The controller 210 may receive the radio signal from the car radio 220, and extract the metadata of the sound signal included in the radio signal received from the car radio 220. Also, the controller 210 may generate the metadata of the audio data in the radio signal through voice recognition. The controller 210 may perform the voice recognition on the radio signal to generate the metadata of the audio data that may identify the advertiser of the advertisement.

The car radio 220 may display the metadata on the display 224 corresponding with the audio data presented to the driver. In case the audio data is the music data, the display 224 may display the metadata of the music data that may be used to identify, label, and present the audio data. In case the audio data is the advertisement, the display 224 may display the metadata of the advertisement such as advertiser name, advertiser phone number, advertiser address, advertised goods and/or services, etc.

The car radio 220 may, during the advertisement of the audio data is played to the driver, receive an phone call request input from the driver. The car radio 220 may include input method through which the driver may input the phone call request. The car radio 220 may include various input methods. For example, the car radio 220 may include a physical button or a touch screen device to receive the phone call request input from the driver.

In response to receiving the phone call request input from the driver, the controller 210 may instruct the broker module 230 to initiate the phone call brokerage service. When instructing the broker module 230 to initiate the phone call brokerage service, the controller 210 may also transmit the metadata of the audio data to the broker module 230 or simply transmit the radio signal directly to the broker module 230. According to the exemplary embodiments, the controller 210 may transmit the extracted or generated metadata to the broker module 230. Also, according to the exemplary embodiments, the controller 210 may not extract or generate the metadata of the audio data of the radio signal, and simply transmit the radio signal to the broker module 230. When the car radio 220 simply transmits the radio signal to the broker module 230, the broker module 230 may extract or generate the metadata of the audio data of the radio signal.

The broker module 230 may generate the service request for the phone call brokerage service to be transmitted to the brokerage server 300. The broker module 230 may incorporate the metadata of the advertisement into the generated service request for the phone call brokerage service. According to the exemplary embodiment, the broker module 230 may incorporate the advertisement code of the advertisement into the service request for the phone call brokerage service.

The broker module 230 may transmit the generated service request for the phone call brokerage service to the Controller 210, and the controller 210 may transmit the controller 210 to the wireless communication module 240. The wireless communication module 240 may transmit the phone call brokerage service generated by the broker module 230 and transmitted through the Controller 210. The wireless communication module 240 may establish the wireless communication network between the wireless communication module 320 of the brokerage server 300, and thereby establishing the wireless communication network between the on-vehicle brokerage system 200 and brokerage server 300.

The wireless communication module 320 may receive the phone call brokerage service from the wireless communication module 240, and transmit the phone call brokerage service to the controller 310. The controller 310 may receive the phone call brokerage service from the on-vehicle brokerage system 200, and the controller 310 may, in response to receiving the request for the phone call brokerage service from the on-vehicle brokerage system 200 via the wireless communication module 320, may extract the metadata of the advertisement from the request for the phone call brokerage service received from the on-vehicle brokerage system 200. According to the exemplary embodiments, the controller 310 may extract the advertisement code of the advertisement from the request for the phone call brokerage service received from the on-vehicle brokerage system 200.

According to the exemplary embodiment, the controller 310 may extract the contact information of the advertiser from data storage 340 that corresponds with the metadata of the advertisement included in the request for the phone call brokerage service received from the on-vehicle brokerage system 200. For example, the controller 310 may extract the contact information of the advertiser from the data storage 340 that corresponds with the advertisement code included in the request for the phone call brokerage service received from the on-vehicle brokerage system 200.

The controller 310 may instruct the brokerage system 330 to initiate the phone call with the advertiser 400. The controller 310 may transmit the contact information of the advertiser extracted from the data storage 340 to the brokerage system 330, along with the instruction to initiate the phone call with the advertiser 400. The controller 310 may control the brokerage system 330 to call the advertiser over a telephone communication.

The brokerage system 330 may establish the phone call connection between the brokerage server 300 and the advertiser 400. The brokerage system 330 may establish the telephone communication with the advertiser 400 by calling the advertiser 400 over the conventional telephone communication using the contact information of the advertiser 400.

Once the brokerage system 330 establishes the phone call connection with the advertiser 400 over the conventional telephone communication, the brokerage system 330 may relay the voice signal from the advertiser 400 to the controller 310. The controller 310 then may relay the voice signal from the advertiser 400 to the on-vehicle brokerage system 200 via the wireless communication module 320, through the wireless communication network established between the wireless communication module 320 of the brokerage server 300 and the wireless communication module 240 of the on-vehicle brokerage system 200.

The on-vehicle brokerage system 200 may function as an interface for the voice signal of the phone call from the advertiser 400 between driver and the advertiser 400. Particularly, the wireless communication module 240 may relay the voice signal from the advertiser 400 to the Controller 210, and the controller 210 may transmit the voice signal from the advertiser 400 to the car radio 220. The car radio 220 may play the voice signal from the advertiser 400 and present the voice signal from the advertiser 400 to the driver.

Furthermore, the car radio 220 may receive and relay voice signal from the driver to the advertiser 400. The car radio 220 may include a microphone. The car radio 220 may record the voice signal from the driver through the microphone, and relay the voice signal from the driver to the Controller 210. The controller 210 in turn may relay the voice signal from the driver to the controller 210 to the brokerage server 300 via the wireless communication module 240, through the wireless communication network established between the wireless communication module 240 of the on-vehicle brokerage system 200 and the wireless communication module 320 of the brokerage server 300.

The brokerage server 300 may function as an interface for the voice signal from the driver between the driver and the advertiser 400. Particularly, the wireless communication module 320 may relay the voice signal from the driver to the controller 310, and the controller 310 may transmit the voice signal from the driver to the brokerage system 330. The brokerage system 330 may relay the voice signal from the driver to the advertiser 400 over the conventional telephone communication established between the brokerage system 330 of the brokerage server 300 and the advertiser 400.

The controller 210 may receive the result of the transmitted service requests from the brokerage server 300 via the wireless communication module 240. According to the exemplary embodiments, the wireless communication module 240 may receive the detailed information corresponding to the metadata of the audio data. The controller 210 of the on-vehicle brokerage system 200 may receive the detailed information including the album art and the lyrics corresponding to the music data and the phone number, the address, the office hours of the advertiser, the online/offline order form, etc. corresponding to the advertisement from the brokerage server 300 via wireless communication module 240. The controller 210 may transmit the detailed information to the car radio 220. The car radio 220 may display the received detailed information on the display 224 while presenting the audio data to the driver.

In exemplary embodiments, the on-vehicle brokerage system 200 and the brokerage server 300, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the on-vehicle brokerage system 200 and the brokerage server 300, and/or one or more components thereof may include or otherwise be associated with one or more memories (not shown) including code (e.g., instructions) configured to cause the on-vehicle brokerage system 200 and the brokerage server 300, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 4A:
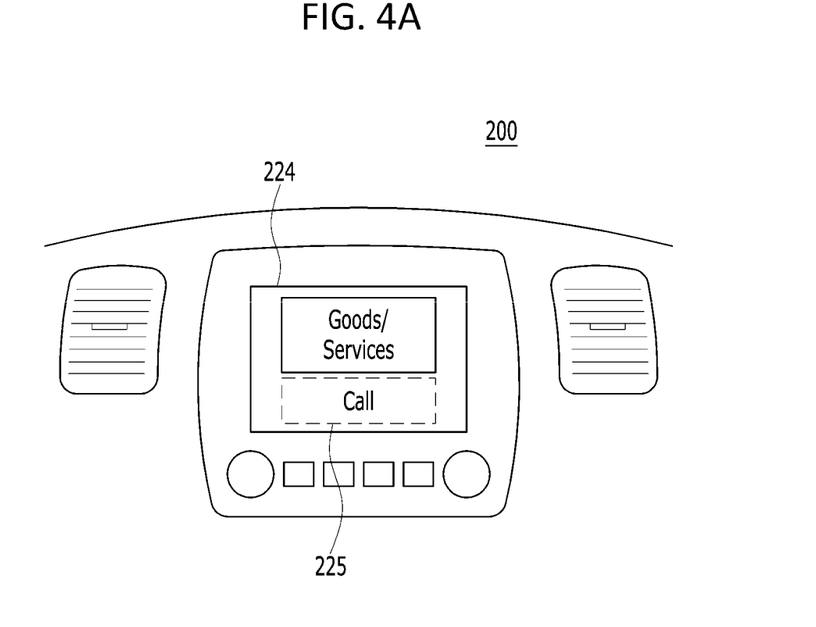
FIGS. 4A and 4B illustrate car radio of the vehicle running the phone call brokerage system, according to an exemplary embodiment of the present disclosure.
Figure 4B:
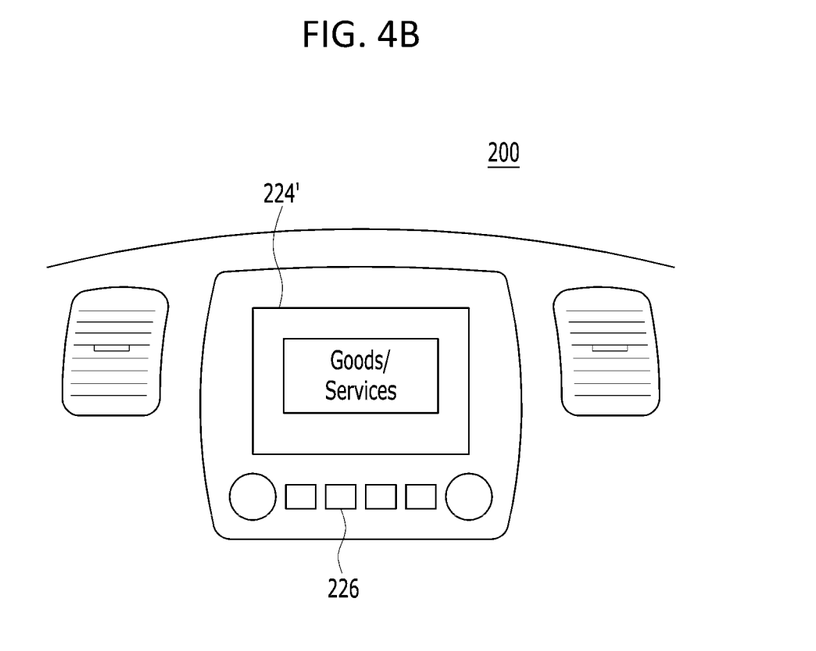

FIGS. 4A and 4B illustrate the car radio 220 of the vehicle running the phone call brokerage system, according to an exemplary embodiment of the present disclosure. Particularly, FIG. 4A illustrates the car radio 220 including a display 224 having touch sensing capabilities, displaying a call icon 225 on the display 224. FIG. 4B illustrates the car radio 220 including a display 224' without touch sensing capabilities and a call button 226 to activate the requesting of the phone call brokerage service.

Referring to FIGS. 2, 4A, and 4B, the on-vehicle brokerage system 200 may extract, generate, or receive the metadata of the advertisement playing on the on-vehicle brokerage system 200. According to the exemplary embodiments, the car radio 220 may display a call icon 225 corresponding to the metadata of the advertisement playing on the car radio 220 on the display 224. The display 224 may further display the detailed information of the advertisement playing on the car radio 220. For example, the display 224 may further display the detailed information of the advertisement such as the phone number, the address, and the office hours of the advertiser, and the online/offline order form, etc. corresponding with the metadata of the advertisement playing on the car radio 220.

Referring to FIG. 4A, the car radio 220 according to the exemplary embodiments may include a display 224 having touch sensing capabilities. The driver may input the phone call request using the touch sensing capabilities of the display 224. Particularly, the car radio 220 may display the call icon 225 on the display 224, and the car radio 220 may receive the phone call request input from the driver touching the call icon 225 displayed on the display 224.

Referring to FIG. 4B, the display 224' may include a call button 226 to activate the requesting of the phone call brokerage service. The driver may input the phone call request using the call button 226 on the car radio 220. Particularly, the car radio 220 may include the call button 226 on the car radio 220, and the car radio 220 may receive the phone call request input from the driver activating the call button 226 on the car radio 220.

Figure 5:
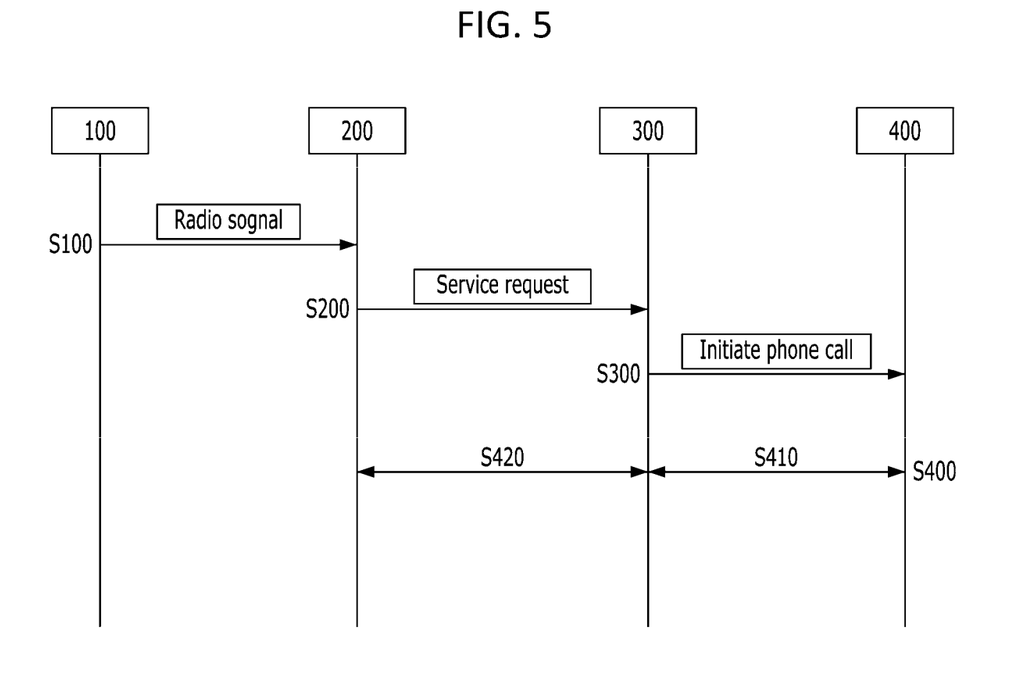
FIG. 5 is a sequence diagram explaining the signal transmission and data processing of the phone call brokerage system, according to an exemplary embodiment of the present disclosure.

FIG. 5 is a sequence diagram explaining the signal transmission and data processing of the phone call brokerage system, according to an exemplary embodiment of the present disclosure.

Referring to FIGS. 2, 3, and 5, the phone call brokerage system may enable the driver to contact the advertiser corresponding to the advertisement playing on the radio.

According to the exemplary embodiments, the on-vehicle brokerage system 200 may receive radio signal from the radio station 100. (S100) The on-vehicle brokerage system 200 may extract the metadata of the sound signal in the radio signal received from the radio station 100. The on-vehicle brokerage system 200 may receive a phone call request from the driver during the on-vehicle brokerage system 200 plays the advertisement. In response to receiving the phone call request from the driver, the on-vehicle brokerage system 200 may initiate the phone call brokerage service.

According to the exemplary embodiments, the on-vehicle brokerage system 200 may generate a service request for the phone call brokerage service by including the metadata of the advertisement into the service request for the phone call brokerage service, and may transmit the service request for the phone call brokerage service to the brokerage server 300. (S200). The on-vehicle brokerage system 200 may establish the wireless connection between the on-vehicle brokerage system 200 and the brokerage server 300, and transmit the service request for the phone call brokerage service to the brokerage server 300.

According to the exemplary embodiments, in response to receiving the service request for the phone call brokerage service from the on-vehicle brokerage system 200, may establish the phone call connection between the brokerage server 300 and the advertiser 400. In response to receiving the service request for the phone call brokerage service from the on-vehicle brokerage system 200, the brokerage server 300 may extract the metadata of the advertisement from the request for the phone call brokerage service received from the on-vehicle brokerage system 200. The brokerage server 300 may extract the contact information of the advertiser stored in the data storage 340 that corresponds with the metadata of the advertisement from the request for the phone call brokerage service.

According to the exemplary embodiments, the brokerage server 300 may initiate the phone call with the advertiser 400 that correspond with the contact information extracted according to the metadata of the advertisement received in the request for the phone call brokerage service. (S300) The brokerage server 300 may establish the telephone communication with the advertiser 400 by calling the advertiser 400 over the conventional telephone communication using the contact information of the advertiser 400.

According to the exemplary embodiments, the voice signal from the advertiser 400 may be transmitted to the driver. (S400) Once the brokerage server 300 establishes the phone call connection with the advertiser 400 over the conventional telephone communication, (S410) the brokerage server 300 may relay the voice signal from the advertiser 400 to the on-vehicle brokerage system 200. (S420) The brokerage server 300 may relay the voice signal from the advertiser 400 to the on-vehicle brokerage system 200 over the wireless communication network established between the brokerage server 300 and the on-vehicle brokerage system 200. The on-vehicle brokerage system 200, in response, may play the voice signal from the advertiser 400 to the driver on the car radio 220.

According to the exemplary embodiments, the on-vehicle brokerage system 200 may receive the voice signal from the driver and transmit the voice signal from the driver to the advertiser 400. (S400) The on-vehicle brokerage system 200 may record the voice signal from the driver and transmit the voice signal from the driver to the brokerage server 300 over the wireless communication network established between the on-vehicle brokerage system 200 and the brokerage server 300. (S420) The brokerage server 300, in turn, may relay the voice signal of the driver received from the on-vehicle brokerage system 200 to the advertiser 400 over the conventional telephone communication established between the brokerage server 300 and the advertiser 400.

According to the exemplary embodiment, the phone call brokerage system may enable the driver to contact the advertiser corresponding to the advertisement playing on the radio. The phone call brokerage system according to the exemplary embodiment may provide a phone call interface that may enable the driver to contact the advertiser corresponding to the advertisement playing on the radio while driving the vehicle. Furthermore, according to the exemplary embodiments, the phone call brokerage system may monitor the phone calls made through the brokerage server 300 to the advertiser 400, which may be used to analyze the effectiveness of the advertisement and provide targeted marketing to the customers on the road.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing a phone call brokerage service to a driver of a vehicle using a phone call brokerage system including an on-vehicle brokerage system and a brokerage server, the method comprising:
   receiving, by the on-vehicle brokerage system, a radio signal from a radio station, the radio signal including an advertisement and a metadata of an advertisement;
   initiating, by the on-vehicle brokerage system, the phone call brokerage service in response to receiving a phone call request from the driver, comprising: generating a service request for the phone call brokerage service including the metadata of the advertisement;
   establishing, by the on-vehicle brokerage system, a wireless connection between the on-vehicle brokerage system and the brokerage server, comprising: transmitting the service request for the phone call brokerage service to the brokerage server;
   establishing, by the brokerage server, a phone call connection between the brokerage server and an advertiser corresponding with the metadata of the advertisement; and
   relaying voice signals between the driver and the advertiser through the wireless connection established between the on-vehicle brokerage system and the brokerage server and the phone call connection between the brokerage server and the advertiser.

2. The method of claim 1, wherein the establishing of the phone call connection comprises:
   extracting a contact information of the advertiser; and
   initiating the phone call with the advertiser by calling the advertiser using the contact information.

3. The method of claim 1, wherein the relaying of the voice signals comprises:
   transmitting the voice signal of the advertiser from the advertiser to the driver, comprising:
      transmitting the voice signal of the advertiser from the advertiser to the brokerage server over the phone call connection between the brokerage server and the advertiser; and
      transmitting the voice signal of the advertiser from the brokerage server to the on-vehicle brokerage system over the wireless connection established between the on-vehicle brokerage system and the brokerage server.

4. The method of claim 1, wherein the relaying of the voice signals comprises:
   transmitting the voice signal of the driver from the driver to the advertiser, comprising:
      transmitting the voice signal of the driver from the on-vehicle brokerage system to the brokerage server over the wireless connection established between the on-vehicle brokerage system and the brokerage server; and
      transmitting the voice signal of the driver from the brokerage server to the advertiser over the phone call connection between the brokerage server and the advertiser.

5. The method of claim 1, wherein the on-vehicle brokerage system comprises: a controller; a car radio; a broker module; a wireless communication module; and a data storage, and
   wherein the receiving of the radio signal comprises:
      receiving, by the car radio, the radio signal, extracting the advertisement from the radio signal, and playing the advertisement to the driver.

6. The method of claim 5, wherein the initiating of the phone call brokerage service comprises: extracting the metadata of the advertisement presented to the driver.

* * * * *